United States Patent

[11] 3,625,579

[72] Inventor Einar O. Lunde
 66 Calypso Shores, Novato, Calif. 94947
[21] Appl. No. 21,722
[22] Filed Mar. 23, 1970
[45] Patented Dec. 7, 1971

[54] BEARING STRUCTURE
 8 Claims, 3 Drawing Figs.
[52] U.S. Cl. .................................................. 308/227
[51] Int. Cl. .................................................. F16c 19/10
[50] Field of Search ........................................... 308/231,
 227, 230, 228, 187

[56] References Cited
 UNITED STATES PATENTS
2,803,507 8/1957 Mempel et al. ............... 308/184

FOREIGN PATENTS
1,467,971 12/1966 France ........................ 308/231

Primary Examiner—Martin P. Schwadron
Assistant Examiner—Frank Susko
Attorneys—Emory L. Groff and Emory L. Groff, Jr.

ABSTRACT: A support means has a recess which receives a portion of a rotatable means. A thrust bearing and a cushion pad support the lower end of the rotatable means, and a well is provided in communication with the bottom of the recess. A lubricant reservoir is provided in the upper part of the rotatable means and has lubricant therein as well as air in the upper part thereof. A pivot pin is supported by the rotatable means and a flexible conduit connects the lubricant reservoir with a groove formed in the interior of a sleeve journaled on the pivot pin. Means is provided for filling the lubricant reservoir and for venting the groove in said sleeve when filling the groove with lubricant.

PATENTED DEC 7 1971

INVENTOR
EINAR O. LUNDE

BY Emory L. Groff Jr.

ATTORNEY

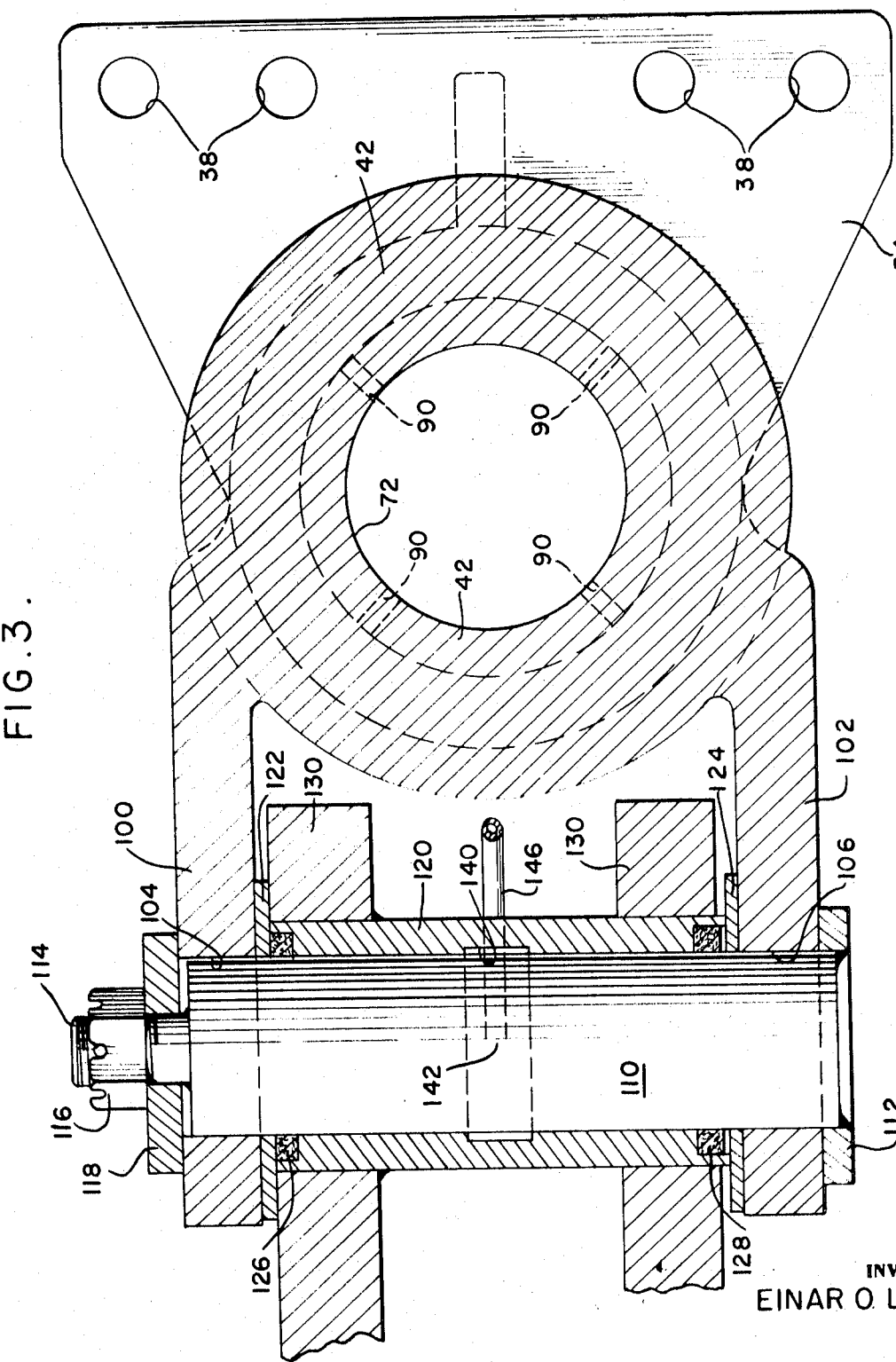

BEARING STRUCTURE

BACKGROUND OF THE INVENTION

The present invention relates to a bearing structure which can be used in various applications and which is particularly suitable for use as the heel fitting for a swinging cargo boom as commonly employed on cargo ships. It should be understood that the structure of the present invention can also be employed for various other rotatable bearing applications such as a heel block fitting or a fitting at the topping lift in association with a cargo boom. The bearing structure could also be employed in a vang fitting or with a weather cock or the like.

The construction of the present invention has particular utility when utilized as a heel fitting for a swinging cargo boom wherein certain problems are encountered which often cause conventional boom heel fittings to fail or operate in an unsatisfactory manner.

Conventional boom heel fittings are liable to be overfilled such that upon temperature changes, the pressure may increase to a point where the gaskets will blow out. This may cause freezing of the principle rotatable member of the fitting causing the device to become completely inoperative. Additionally, it is difficult to assure perfect alignment for the thrust bearings of such constructions, and the fittings are inadequately protected from impact loads occurring due to slamming during rough weather. Condensate due to breathing caused by temperature changes also creates a problem with known constructions.

SUMMARY OF THE INVENTION

In the present invention, a support means is adapted to be fixed to a structure such as a kingpost on a ship and has a recess which receives a portion of the rotatable means. A thrust bearing engages the lower end of the rotatable means and is supported by a cushion pad at the bottom of the recess in the support means. A well is in communication with the bottom of the recess and receives a member secured to the rotatable means.

A lubricant reservoir is provided in the upper part of the rotatable means and has lubricant such as oil therewithin, the upper part of the reservoir being filled with a compressible gas such as air. Filling means is provided for filling the reservoir, and holes extend through the wall of the rotatable means so that lubricant is gravity fed into the aforementioned recess.

A pivot means is supported by the rotatable means and includes a pivot pin upon which is journaled a sleeve secured to a boom or the like. A flexible conduit provides communication from an outlet formed in the lubricant reservoir of the pivot pin.

With this construction, the lubricant reservoir serves to lubricate the components disposed within the recess of the support means as well as the pivot means which is supported laterally outwardly of the support means and the lubricant reservoir.

The construction of the present invention completely eliminates maintenance between the compulsory inspection periods of boom heel fittings which is generally 4 years. Gravity feeding of oil into the bearing structure prevents overfilling to an extent that would cause pressure increases due to temperature changes to blow out the gaskets.

Additionally, the air cushion provided in the upper part of the lubricant reservoir is of sufficient volume in relation to the volume of oil to prevent a pressure build up under any temperature differential that would be normally encountered to prevent the oil seals from being blown out.

Any failure of parts in the boom heel connection or of gaskets in the structure and leakage of lubricant therefrom would still result in lubricant being provided within the recess in the support member so that the main rotating member is lubricated at all times. This provides a substantial safety factor so as to protect the main portion of the bearing structure.

The cushion pad assures perfect alignment of the thrust bearing and also provides protection from impact loads due to slamming during rough weather.

Any condensate due to breathing caused by temperature changes will automatically settle into the well in communication with the bottom of the recess since such condensate has a higher density.

The friction factors are only of importance when the boom is topped to maximum height with a minimum lever arm. In this position, the greatest component of the boom load will be a vertical component which is then supported by the antifriction thrust bearing engaging the bottom of the rotatable means.

DESCRIPTION OF THE PREFERRED EMBODIMENT

Figure 1:
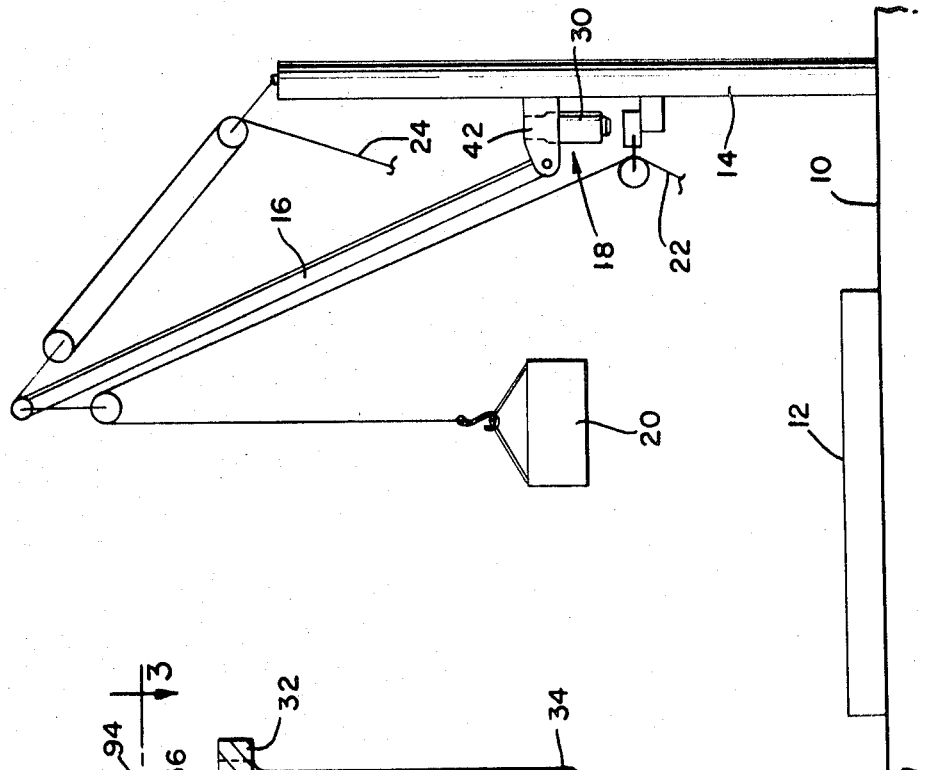
FIG. 1 is a somewhat schematic view illustrating the manner in which the bearing structure of the present invention may be incorporated in a boom heel fitting.

Referring now to the drawings wherein like reference characters designate corresponding parts throughout the several views, as seen in FIG. 1, the deck of a ship 10 has a cargo hatch 12 thereon. A kingpost 14 extends upwardly from the deck and supports a cargo boom 16 which is supported at its lower end on a boom heel fitting indicated generally by reference character 18. A load 20 is supported by the boom and a first line 22 extends to a cargo hoisting wench and a second line 24 extends to a topping lift wench in the usual manner.

Figure 2:
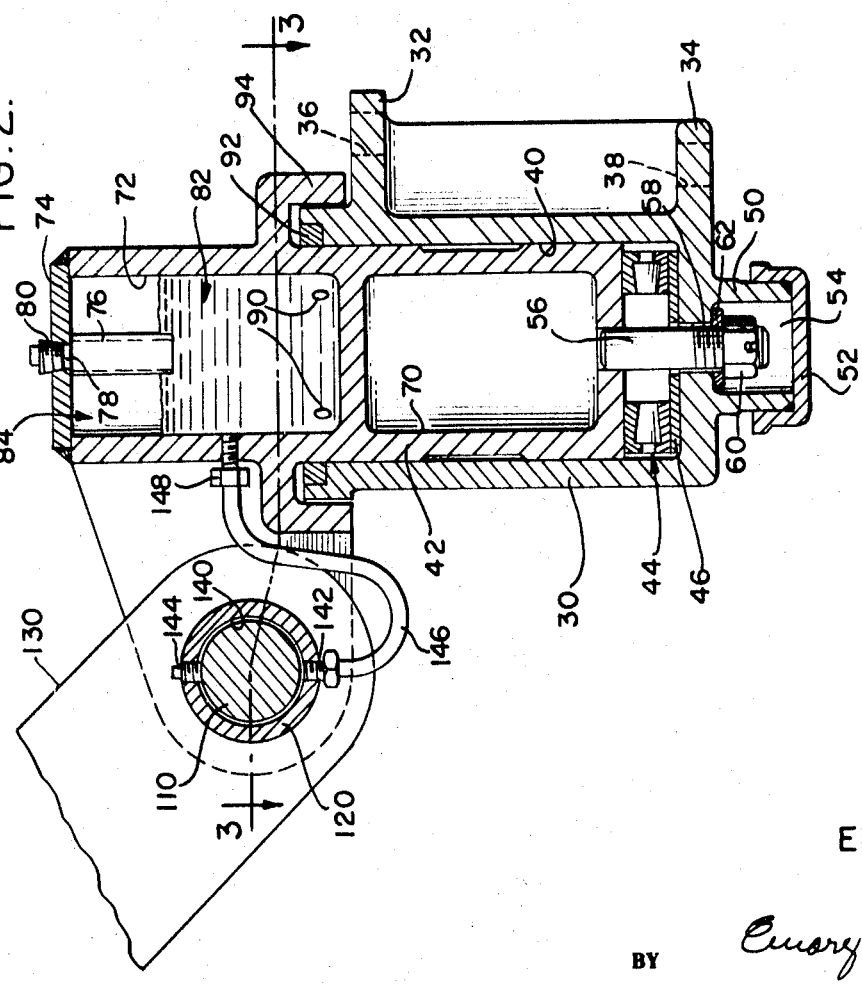
FIG. 2 is an enlarged cross-sectional view through the boom heel fitting shown in FIG. 1; and, FIG. 3 is an enlarged sectional view taken substantially along lines 3—3 of FIG. 2 looking in the direction of the arrows.

Referring now to FIGS. 2 and 3 of the drawings, a support means 30 includes an upper flange 32 and a lower flange 34, these flanges having holes 36 and 38 formed therethrough respectively for rigidly attaching the support means to a kingpost or the like.

The support means has a cylindrical recess 40 formed therein which rotatably receives the lower portion of a rotatable means 42. A thrust bearing 44 comprises a tapered roller bearing engaging the bottom of the rotatable means 42, this thrust bearing being supported on a cushion means 46 in the form of a fabrica or similar neoprene impregnated cushioning pad. The thrust bearing and cushion means may be eliminated if the bearing structure is used in an application such as a heel block fitting, wherein the vertical load applied thereto is not of great magnitude.

A tubular portion 50 extends downwardly from the undersurface of the support means and a cap 52 is fixed to the lower end thereof so as to define a well 54 therewithin. A member 56 is secured to the lower end of the rotatable means and extends downwardly through a hole 58 formed in the bottom of the support means and in communication with the recess 40 therewithin. The lower end of member 56 is threaded, and a nut 60 is threaded thereon and engages a washer 62.

It is apparent that nut 60 will prevent the rotatable means from being lifted out of the recess in the support means, and hole 58 will provide communication between the bottom of recess 40 formed in the support means and well 54 whereby any condensate can automatically settle into the well since such condensate will have greater density.

A hollow chamber 70 is formed in the bottom portion of the rotatable means, and a lubricant reservoir 72 is formed in the upper part of the rotatable means, the upper end of this lubricant reservoir being closed off by an end plate 74 rigidly fixed in the operative position shown.

A filling tube 76 is secured to plate 74 and is in communication with a hole 78 formed through plate 74, a plug 80 being provided for closing off the filling means. The filling means is adapted to fill the lubricant reservoir with a body 82 of lubricant such as oil up to the level indicated. When the reservoir is so filled with oil, a body of compressible gas such as air will be trapped within the upper portion 84 of the lubricant reservoir so as to form a resilient cushion means of such a volume in relation to the volume of oil so as to enable a pressure buildup under temperature conditions without blowing the oil seals.

A plurality of holes 90 shown as being four in number are formed at equally spaced points through the wall of the rotatable means and provide communication between the lower part of the lubricant reservoir and the recess formed within the support means.

In this manner, the lubricant is gravity fed from the lubricant reservoir into the recess and downwardly therewithin so as to lubricate the components within the recess at all times.

An oil seal gasket 92 is supported in the operative position as shown and engages the outer surface of the rotatable means to provide a seal therewith during operation of the apparatus. A depending annular flange 94 is carried by the rotatable means and extends around the upper portion of the support meant so as to protect the oil seal gasket from damage.

As seen most clearly in FIG. 3, a pair of ears 100 and 102 are formed integral with rotatable member 42 and extend laterally therefrom in parallel relationship respective to one another. These ears have holes 104 and 106 formed therethrough which receive a pivot pin 110. An annular collar 112 is fixed to one end of the pivot pin, and the opposite reduced end 114 of the pin is threaded and receives a nut 116 engageable with an annular member 34 for securing the pivot pin in the operative position indicated.

A cylindrical sleeve 120 is rotatably journaled on the pivot pin and engages washers 122 and 124 at opposite ends thereof, oil seals 126 and 128 being supported within suitable grooves provided at opposite ends of the sleeve and engaging the pivot pin to provide a seal therewith. Base portions 130 of boom 116 previously described are rigidly secured to sleeve 120.

An annular groove 140 is formed circumferentially around the inner periphery of sleeve 120. A fitting 142 is mounted in a hole provided in sleeve 120 and is in communication with annular groove 140. A hole is provided through sleeve 120 at a point diametrically opposite to fitting 142, this last mentioned hole normally being closed off by a plug 144. This plug is removed when groove 140 is being filled with oil to let entrapped air escape therefrom.

Fitting 142 is connected by a flexible conduit 146 with an outlet fitting 148 mounted in a hole provided in the wall of rotatable member 42, fitting 148 providing communication with the interior of the lubricant reservoir. It is apparent that lubricant is also gravity fed through conduit 146 from the lubricant reservoir to the pivot means.

As this invention may be embodied in several forms without departing from the spirit or essential characteristics thereof, the present embodiment is therefore illustrative and not restrictive.

What is claimed is:

1. A bearing structure comprising support means having a recess therein, rotatable means including a portion rotatably received within said recess, said rotatable means including a lubricant reservoir having a lubricant therein, a part of said reservoir being filled with a compressible gas, said support means including a well in communication with the bottom of said recess, a member connected to said rotatable means and extending into said well, and means for filling said reservoir, said reservoir being in communication with said recess to gravity feed lubricant from said reservoir to said recess.

2. A bearing structure as defined in claim 1, including a thrust bearing supported by said support means and engageable with said rotatable means for receiving thrust loads from said rotatable means and for facilitating rotation of the rotatable means with respect to the support means.

3. A bearing structure as defined in claim 2, including cushion means supported by said support means and engaging said thrust bearing.

4. A bearing structure as defined in claim 1 wherein said rotatable means includes a wall portion defining said lubricant reservoir therewithin, hole means being formed through said wall to provide said communication between the lubricant reservoir and said recess.

5. A bearing structure comprising support means having a recess therein, rotatable means including a portion rotatably received within said recess, said rotatable means including a lubricant reservoir having a lubricant therein, a part of said reservoir being filled with a compressible gas, pivot means supported by said rotatable means, an outlet from said lubricant reservoir, means connecting said outlet with said pivot means to provide lubricant to said pivot means, and means for filling said reservoir, said reservoir being in communication with said recess to gravity feed lubricant from said reservoir to said recess.

6. A bearing structure as defined in claim 5, wherein said pivot means includes a pivot pin, a sleeve rotatably journaled on said pivot pin, and means connected with said sleeve.

7. A bearing structure as defined in claim 6, wherein said sleeve has a circumferentially extending groove formed on the inner surface thereof, said means providing communication between the outlet from said lubricant reservoir and said pivot means comprising a flexible conduit in communication with said groove.

8. A bearing structure as defined in claim 7, wherein said sleeve has a vent hole formed therethrough, and plug means for normally closing off said vent hole.

* * * * *